Patented Feb. 27, 1951

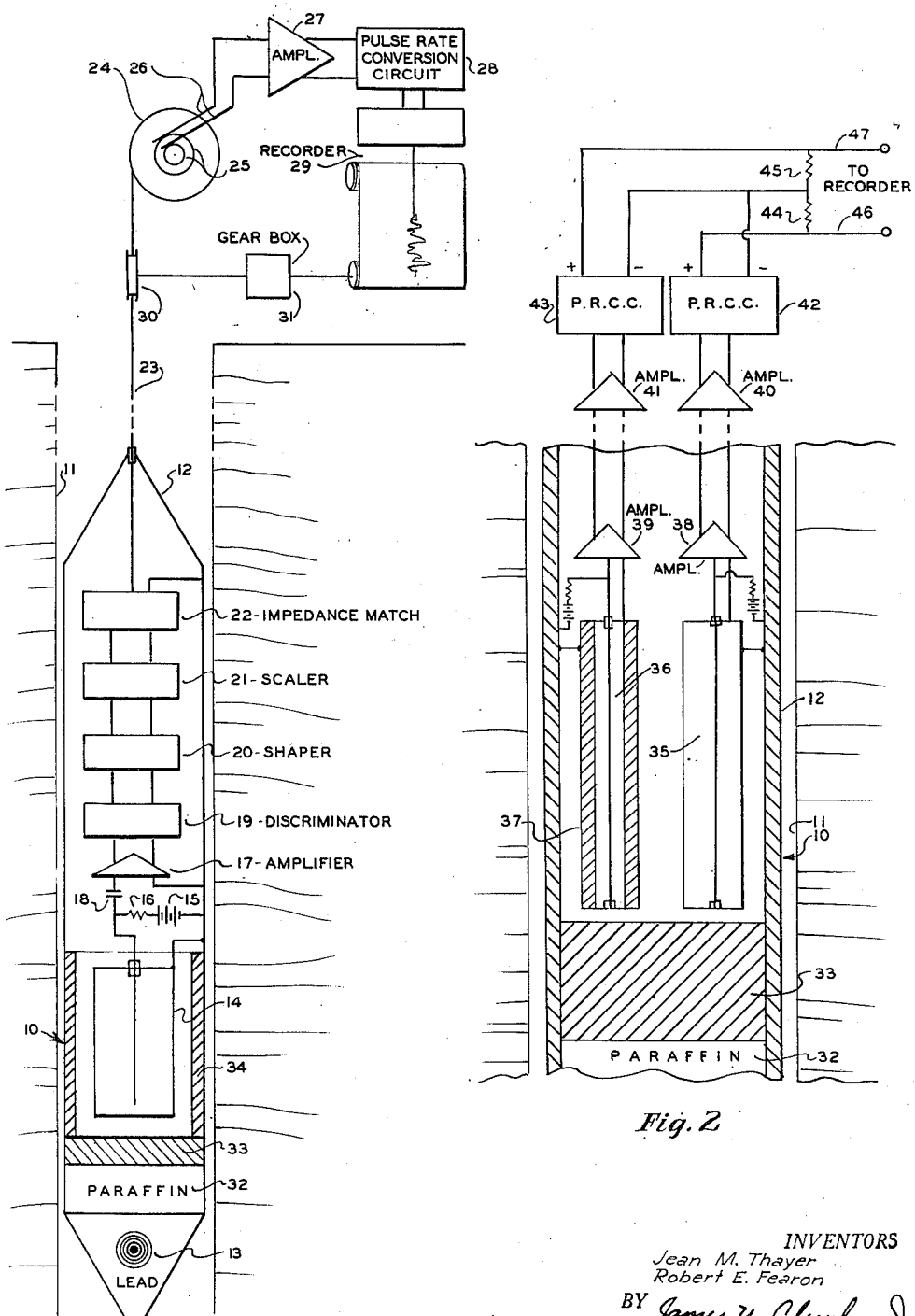

2,543,676

UNITED STATES PATENT OFFICE 2,543,676

METHOD AND APPARATUS FOR NEUTRON WELL LOGGING

Jean M. Thayer and Robert E. Fearon, Tulsa, Okla., assignors to Well Surveys, Incorporated, Tulsa, Okla., a corporation of Delaware Application July 28, 1949, Serial No. 107,258

6 Claims. (Cl. 250—83.6)

This invention relates generally to the art of geophysical prospecting and more particularly to neutron well logging.

Neutron well logging can in general be said to be any well logging process which directly involves the use of neutrons. There are three distinct generic classes of neutron logging. First, there is the neutron-gamma curve wherein the formations are bombarded with neutrons and gamma rays resulting from neutron interactions in the formations are measured at the detector. Second, there is the neutron-neutron log in which the formations are bombarded with neutrons and the variations in neutron flux returning to the detector are measured. The third is the gamma-neutron curve in which the formations are bombarded with high energy gamma rays and the photo-neutrons which reach the detector are measured.

The present invention is directed to neutron-neutron logging in that a novel method and apparatus is provided for detecting slow neutrons in the presence of a large flux of gamma radiation together with a novel system for distinguishing slow neutron processes from other similar lower energy processes. By slow neutron processes is meant processes caused by neutrons having kinetic energies extending from the lowest thermal energies up to 10 volts. A modification of this invention extends the above range of detectable neutron energies upwardly to 1000 electron volts. This invention contemplates the identification, location, and measurement of the relative amounts of chemical elements or valuable substances through their component chemical elements by the influence of their nuclear parameters upon a flux of fast neutrons. This is accomplished by measuring neutrons that have lost most of their kinetic energy. An example of the application of this invention is to the location and identification of petroleum in difficultly accessible places, such as in strata penetrated by a drill hole.

Of prime importance to any method in which the formations are bombarded with neutrons, obviously, is a source of neutrons. The most common practice in the well logging industry today is to make a small capsuled source, in which the nuclei of some light element are bombarded with the heavy particle radiation from some naturally radioactive element. Specifically, probably the most widely used of these sources is the type wherein beryllium is bombarded with the alpha rays from radium and its daughter products. Such a source is small, convenient, reasonably plentiful in neutron output and has a very long life. The output for some of the better sources of present day manufacture, depending on mixing factor and on what radium salt is used, is approximately $1.5 \times 10^7$ neutrons per second per curie of radium. The energy per emitted neutron in the case of the radium beryllium source has an approximately average value of 5.7 M. E. V. (million electron volts). Since the distance to which any given neutron will penetrate the formations surrounding a bore hole is a function of its kinetic energy, this average value of 5.7 M. E. V. gives assurance of a reasonable penetration into the formations. However, concomitant with the emission of these neutrons from the source, there is emitted from the source a tremendous number of gamma rays. The energy of these gamma rays ranges from 2.198 M. E. V. down to 0.184 M. E. V. with the average energy of gamma ray per alpha disintegration of radium being 1.7893 M. E. V. If one considers only those gamma rays which range from 1 M. E. V. to 2.198 M. E. V., it will be found that there are .665 of these per alpha disintegration of radium, or $2.46 \times 10^{10}$ gamma rays emitted per second per curie of radium, each having an energy in excess of 1 M. E. V. Comparing this figure with the number of neutrons, per curie of radium, emitted from a radium-beryllium source one finds that there are approximately 16,100 times as many gamma rays with energy in excess of 1 M. E. V. as there are neutrons emitted from the source. With the densest practical shield now in use, this factor is only reduced at the outer periphery of the shield by a ratio of 10 to 1, or to approximately 1600 gamma rays per neutron.

Even if one makes the untrue but optimistic assumption that all gamma rays leaving the source on direct path to the detector can be stopped by interposing some massive dense shield in this path, one is faced with the proposition that at least part of this tremendous flux of gamma rays will be scattered in the formations and returned to the detector. Moreover, while admitting that the neutrons in many formations may have a slightly longer average range than the gamma rays, the relative effect of any given formation on these two types of radiation will not always be the same. In other words, one particular formation may have higher than average attenuation for neutrons but less than average attenuation for gamma rays. A practical example of this is a highly porous formation containing a large amount of hydrogeneous fluid (either water or oil). The next formation may have just the opposite effect—a higher than average attenuation of gamma rays and a less than average attenuation for neutrons. A formation typical of this effect is a dry limestone of high density. Furthermore, between these two limits in which the formations reverse their relative attenuation of the two types of radiation, there are many "in between" cases where the formations have almost the same effect upon neutrons and gamma rays.

Now, if an attempt is made to make a well logging curve in which total ionization due to capture of slow neutrons in the detector is measured, the result is obviously an almost totally confused and indeterminate curve. Another way of stating this proposition is that, due to gamma rays emanating from the source alone, there will be many times as many gamma rays arriving at the detector as there will be neutrons.

There is, of course, an obvious but difficult answer and that is the provision of a gamma-ray free source. A polonium-beryllium source answers this, but it has several attendant drawbacks. One is the fact that there is an acute shortage of polonium and there seems no possible way of providing the amount that would be required for even the present day well logging needs. The second is that even with a sufficient supply, it would still be very expensive because the yield of neutrons per curie of polonium is much less than per curie of radium. Third, the half life of polonium is inconveniently short (140 days) and would require frequent replenishment of sources. This last difficulty could be overcome by constantly growing the polonium indirectly from radium D placed in the source. This, of course, is exceedingly expensive and very limited in availability. It must also be remembered that these sources are not strictly gamma-ray free because the alpha-beryllium reaction has as one of its products the emission of a large amount of photon energy in the form of a gamma ray. Quantitatively, this is not extremely bad as there is only a one for one ratio between gamma rays and neutrons.

However, if one does suppose a gamma-ray free neutron source, there are other difficulties that present themselves. Neutrons upon interacting with the nuclei of the different elements present in the formations participate in several different types of reactions, the principal ones of which are (1) elastic scattering, (2) inelastic scattering, (3) fission of some elements in the formations and (4) capture by elements in the formations.

The case of fission of elements in the formations is extremely rare because of the relative paucity of heavy elements occurring in formations surrounding most bore holes. The heavy elements, of course, are the ones that are most easily fissionable. However, the probability of fission increases as the energy of bombarding neutrons is increased. If it were possible to make a neutron source which emitted neutrons of transcendentally greater energy than those now available, it is certain that fission would become an important mechanism in the art of neutron well logging. However, since at present the probability of this reaction is relatively small, the details of it need not be discussed here.

Elastic scattering is the nuclear reaction which, as the name implies, describes the ballistic interaction between two nuclear particles. In this specific case the neutron is scattered in some direction depending upon the mass of the particle hit and the angle of the collision. If the bombarding neutrons are fast neutrons, the mechanics of the reaction are similar to the ballistics of spherical particles. Furthermore, elastic scattering is the only reaction that most neutrons undergo in reaching the detector. There is a very small portion which undergo inelastic scattering in the immediate vicinity of the detector, and hence, still retain enough energy to have an appreciable probability of reaching the detector. Neutrons undergoing inelastic scattering lose much of their energy in a single collision. Neutrons elastically scattered from nuclei of any but the very light elements lose little of their energy in any given collision. As a result, they can suffer many collisions before becoming slow neutrons. Scattering by hydrogen nuclei, of course, is an extremely different case. Here the bombarding neutron, on the average, will lose all but $1/e$ of its kinetic energy, and, of course, has a limit of almost 100 per cent loss for those cases which approach "head-on" collisions. This then, makes it clear that when surrounded with hydrogen-rich formations, there will be very few neutrons reaching the detector unless the source detector spacing is extremely short.

Inelastic scattering is the nuclear reaction in which the two particles involved do not resemble two colliding rubber balls, and much of the kinetic energy of the impinging particle is converted into photon energy. Inelastic scattering is more frequently observed in cases where the incident neutron possesses one or more M. E. V. of kinetic energy. This is due to the fact that the neutron is not captured, but is scattered in some random direction and the residual nucleus is left in an excited unstable state, the degree of which depends upon the spacing of the characteristic energy levels of this nucleus and the angle at which the neutron struck. Since the nuclear energy levels of the light elements are, for the most part, quite widely spaced and, since the nucleus can absorb energy by this method only in discreet quanta which correspond to the energy difference between one or more of these levels, there is appreciable probability that a neutron will lose a large percentage of its energy in any inelastic collision. The length of time that the nucleus remains in this excited state is usually very short. When the nucleus returns to its original lower energy state, there is a release of considerable energy. Since this reaction does not correspond with any attendant change in mass or change of the nucleus, this available energy must manifest itself in the form of one or more gamma rays. The energy of this gamma ray depends upon the total available energy from the excited nucleus, upon how many energy levels have to be descended, and, in the case of multiple levels, what the probability is that more than one of these levels will be descended in the emission of a single photon. Sometimes this transition is accomplished in a single step and sometimes it takes several steps. These photons, like those arising from the neutron source itself, are extremely objectionable when one is trying to measure neutrons returns to the detector, because they tend to hinder the measurement of the informative processes.

Neutron capture is a process wherein a neutron which collides with some nucleus present in the formations is absorbed or captured by the nucleus. There is an attendant mass change in the nucleus of approximately one mass unit, but there is no change in nuclear charge. The greatest probability of capture occurs for neutrons of relatively small energy. There is a possibility of capture of fast neutrons, and there are detectable resonances in the higher energies corresponding to values equivalent to the spacings of the different nuclear energy levels. However, these resonances are not particularly sharp, nor do their values greatly exceed the average values of the probability for this reaction over this region of neutron energy. Furthermore, the average value of the probability of this reaction over this region of high neutron energy is considerably smaller than the value for neutrons of thermal and epithermal energy. This probability of reaction is sometimes stated differently as being the nuclear target cross-section, this being given in the terms of barns, one barn being $10^{24}$ cm. $^{-2}$.

Four possible nuclear reactions of neutrons in the strata have now been treated. Of these four, there are but three that have sufficient probability of occurrence to be worth consideration in present well logging methods. These are elastic scattering, inelastic scattering and capture.

Having dealt with the possible interaction of neutrons in the formations, now consider what radiation measurements are necessary to make a neutron-neutron log of the type in which slow neutrons are measured at the detector. If it is remembered that elastic scattering results in neutrons arriving at the detector and inelastic scattering and capture largely results in the production of photon energy which is of the nature of an interfering process, it is to be seen that any detector to be employed must measure neutrons and be able to ignore the presence of a large flux of photon energy, i. e., gamma radiation. Of course, any neutron source which emits gamma radiation will cause additional gamma radiation at the detector, which is also in the nature of an interfering process. Folkert Brons, in his disclosure in Patent No. 2,220,509, described only the means of differentiation between these two types of radiation by shielding. This does not afford adequate differentiation. If neutrons are to be distinguished from gamma rays, the detecting means must be able to differentiate between the two on the basis of energy liberated in the detector per individual event. If there is to be good differentiation between the two on the basis of individual event, then means must be arranged in the detector whereby the energy liberation per neutron event is sufficiently greater than the energy liberation per gamma ray that no coincidence of gamma rays can be expected which will result in total energy liberation equal to that of a single neutron event. This is tantamount to saying that the detection of a neutron must result in some heavy particle process, for instance, capture of a neutron by the boron isotope of ten mass units. This results in the production of boron isotope of eleven mass units, but since the rest mass of the neutron is in excess of the mass difference between $B^{10}$ and $B^{11}$, the nucleus is unstable and an alpha particle is emitted. Since the alpha particle and the residual nucleus of $Li^7$ are of comparable weight, the reaction produces two heavy recoils, both of which have large energy and cause much ionization. Since there are two heavy recoils, an alpha particle and $Li^7$, the total ionization resulting from these in any proportional counter, or counting chamber, will be tremendous compared to that due to any concatenation of gamma events. Any detector, then, which will fulfill the requirements for slow neutron detection will necessarily have to create a large difference in the energy liberation between the wanted and unwanted processes. Then it is necessary that means be provided for selecting the large energy processes and rejecting the small energy processes.

Therefore, the primary object of this invention is to provide a method and means for the identification, location and measurement of chemical elements or valuable substances through their component chemical elements.

Another object of this invention is to provide means for identifying and locating petroleum in difficultly accessible locations such as in the formations penetrated by a drill hole.

It is a further object of this invention to achieve the above objects by detecting slow neutrons in the presence of a large flux of gamma radiation together with means for distinguishing slow neutron events from other similar lower energy events.

This invention also contemplates special means whereby neutrons having energies lying between two electron volts and 100 electron volts can be detected.

Still another object is to achieve the preceding object by detecting neutrons having energies as high as 1000 electron volts.

A further object of this invention is to provide an electrical system, adapted for use in a well surveying operation, whereby pulses produced in the detection of slow neutrons can be conditioned, converted into a direct current which varies in accordance wih their rate of production, and recorded in correlation with the depth in the well at which the pulses were produced.

This invention further contemplates providing the detector with a shield formed of a material that will modify the energy of the neutrons entering the detector for the purpose of extending the energy range throughout which neutrons are detected.

Another object of this invention is to provide a shield, formed of a specific substance, for a detector of neutrons that will enable the detection of that substance.

Other objects and advantages of the present invention will become apparent from the following detailed description when taken with the drawings, in which Figure 1 is a schematic view of a well surveying operation in which the detecting instrument is partly shown in vertical section; and Figure 2 is a fragmentary view of a well surveying operation showing a twin detector arrangement in vertical section and means for electrically effecting a subtraction of one log from another as they are simultaneously made.

Referring to the drawings in detail, particularly Figure 1, there is illustrated a well logging operation. A well logging subsurface instrument 10 is shown disposed in operative position in a drill hole 11 which may or may not be cased. The subsurface instrument 10 comprises a housing 12 which encloses a source of neutrons 13, a neutron detector 14 and the necessary electrical equipment for conditioning electrical pulses produced by the detector 14 before they are transmitted to the recording equipment located on the surface of the earth adjacent the mouth of the well.

The detector 14 may be an enriched boron trifluoride counter having conventional electrodes disposed therein. The electrode circuit includes the battery 15 and resistance 16. This circuit is coupled to the amplifier 17 through a condenser 18. Signals produced by the detector are amplified by amplifier 17 and conducted to a discriminator 19. The discriminator output is fed through a shaping circuit 20 to a scaling circuit 21. The output from the scaling circuit 21 is fed through impedance matching means 22 to the transmission line contained in the cable 23. Cable 23 extends to the surface where it is wound upon, or unwound from, a drum 24 as the instrument is raised or lowered in the drill hole 11. Electrical connection is made to the transmission line, carried by the cable, by means of slip rings 25 and brushes 26. The brushes 26 are connected to the input of an amplifier 27 which, in turn, is connected to a pulse rate conversion circuit 28. The direct current output from the pulse rate conversion circuit 28 is conducted to a recorder 29 where it is recorded in correlation with depth. The depth coordinate is obtained by driving the recorder by a measuring wheel 30 which is driven by the cable 23. A gear box 31 is provided to couple the measuring wheel to the recorder.

Specifically, the detector could be either of two classes, a slow neutron counting chamber or a proportional counter sensitive to slow neutrons.

In the case of a counting chamber, either a filling of a neutron-sensitive gas could be used or any free electron gas could be used with the disposal of some neutron-sensitive material in the chamber, said material being arranged so as to liberate as many ionizing particles as possible into the gas of the chamber. By "free electron gas" is meant gases such as hydrogen, nitrogen, helium, neon, argon, krypton, xenon, and carbon monoxide. Carbon monoxide is restricted for use at low partial pressures. A good example of a neutron-sensitive gas would be boron trifluoride or $He^3$. Of course, maximum sensitivity for $BF_3$ would be obtained when the boron in the gas was chiefly $B^{10}$. Any other gas which had in its formula an element with a propensity for capturing slow neutrons could be used. If a free-electron gas were used, the material distributed for capturing the slow neutrons could be any element such as boron or lithium, which captures slow neutrons, and which produces heavy particle recoils. For the purpose of this invention distinction may be made between counting chambers and counters in the following manner: a chamber is a radiation detector in which there is no gas amplification, and a counter is a radiation detector in which gas amplification is utilized, the extent to which it is utilized depending upon whether it is operated in the proportional or in the Geiger range. The term "gas amplification" is used here to describe that phenomenon in which the anode voltage of the counter is sufficient to cause a certain percentage of liberated electrons to acquire enough kinetic energy between succeeding collisions to dislodge additional electrons, with which they collide, from their bound states in atomic orbits. In other words, an electron avalanche would be produced.

In the case where a counter is used as the detector, the filling gas may be a neutron-sensitive gas as described for the counting chamber, or a free-electron gas with neutron-sensitive material disposed as described in the case of the counting chamber.

Ordinarily with gas amplification, such as is obtained with a proportional counter, it is possible to appreciate more energy from a heavy particle event than would be registered without gas amplification as in a counting chamber. This, in effect, creates a larger signal-to-noise ratio per pulse. However, the counting chamber can appreciate more pulses, especially with a neutron-sensitive gas, because it can be operated at a higher pressure and hence will present an effectively thicker target to the incident neutrons. In either case, the effective target cross-section is sufficient to give a satisfactory sensitivity for well logging, likewise, the signal-to-noise ratio per pulse is satisfactory in either case.

Now, assuming a satisfactory signal-to-noise ratio and an adequate target density in the detector, the device needed to complete this invention is a means of discriminating between the large and small pulses. Th accompanying circuit and its explanation disclose such a device. As pointed out before, novelty does not necessarily reside in the device for discriminating between pulses. Rather, the novelty includes recognizing the nature of the interfering processes, and providing in combination a detector that registers the wanted and the interfering processes differently, and a means of accepting the wanted processes and rejecting the unwanted processes.

Either of the above described detectors may be used in practicing this invention.

In operation slow neutrons entering the detector 14 produce heavy particle recoils which produce ionization by collision with the atoms or molecules of the ionizable medium. The electrons so produced are collected by the central electrode to produce electrical pulses in the external circuit of the detector. These pulses are amplified by the amplifier 17 and fed into the discriminating circuit 19. Discriminating circuit 19 functions to produce a pulse in its output circuit only when pulses whose height exceed a fixed threshold value are fed into it. The threshold value is set so that it will exclude from the output circuit all pulses due to gamma rays. The pulses from the output of the discriminator are fed into a pulse-shaping circuit 20 which functions to produce pulses corresponding in number to that of those fed into it, but giving to each produced pulse uniform height and width. This is to enable each pulse to exert the same effect upon a scaling circuit into which it is fed. The output pulses from the scaling circuit are fed through an impedance matching element 22 into the transmission cable 23 through which they are conducted to the recording system at the surface. The pulses when received on the surface, are amplified by the amplifier 27 and fed into the pulse rate conversion circuit 28 which produces a direct current in its output circuit that varies as the rate of occurrence of the pulses fed into its input. This direct current is then impressed on a recorder 29 to produce a record in correlation with the depth at which the slow neutrons were detected.

The record so made represents the intensity of slow neutrons incident upon the detector. These neutrons are those that have undergone elastic and inelastic scattering in the formations adjacent the bore hole. In order to reduce the flux of slow neutrons reaching the detector on a direct path from the source, there is interposed between the source and the detector a mass of paraffin 32, followed by a mass of slow neutron-absorbing material 33, such as either cadmium, cobalt, gold, boron, indium, silver, etc.

The invention as illustrated in Figure 1 is operative for the purpose of making a slow-neutron log without the shield 34, shown about the detector.

However, when using the shield 34 a new advantage is obtained enabling a greater degree of emphasis to be given to material in the strata containing the same element as that from which the shield is formed. In order to obtain this new advantage a slow-neutron log is first made of the drill hole, then the shield 34 is placed about the detector and a second slow-neutron log is made. The second log is then subtracted from the first log to obtain a log which will emphasize the substance in the formations which corresponds to the substance of which the shield is made.

Brief consideration of the properties of the boron trifluoride counter 14 will show why this is so. The response of the boron, in a boron trifluoride detector, to neutrons of various energies, is a simple function of the energy. It is inversely proportional to the square root of the energy. The energy group of neutrons, which can arise in the strata influenced by the source 13, arrives in the detector 14 and causes an effect there. These energies fall into the lower portion of the energy spectrum commonly thought of as the fast-neutron region. This fact is determined by the circumstance that lower energies could not be transmitted through appreciable casing in the well bore or through intervening water, and by the inability of the detector 14 to efficiently detect any higher energies.

As in the case of resonances related to specific elements appearing in other parts of the neutron spectrum, one will anticipate specific absorptions in this region of energy. For example, there is an absorption peak at 300 electron volts for the element aluminum, the element manganese has a broad resonance between 100 and 1000 electron volts; cobalt has a resonance in the vicinity of 100 electron volts; and other elements having resonances in this energy range are zinc, germanium, zirconium, gold, silver, as well as other valuable elements.

All of the above elements can be emphasized in a neutron logging measurment by using in each case a shield of the corresponding element. This conclusion is a consequence of the fact that in general a selective filter of given characteristics will have a smaller relative influence on radiation already filtered by a similar filter than it would not so filtered. The application of the above principle to the present embodiment is straightforward. The well logging instrument 10 may be regarded as existing in a flux of neutrons produced by the source 13 and filtered through cobalt wherever the strata contain cobalt. Specifically, applying the above general principle, it is apparent that in this example the cobalt shield will exhibit a smaller absorption of the neutron flux than it would were there no cobalt in the strata. Cobalt will therefore be recognized by a relatively higher reading on the log for those strata which contain it.

An apparatus whereby the two above described logs can be made simultaneously and electrically substracted is shown in Figure 2. Referring to this figure, there are shown within the housing 12, detectors 35 and 36. Detector 36 of the type illustrated in Figure 1 and is shown in Figure 2 equipped with a shield 37 which will be formed of a material determined by the chemical element or substance in the formation adjacent the drill hole that it is desired to emphasize. Detector 35 differs from detector 36 in that no shield is used around it. The electrical pulses produced in the external circuits of these detectors are fed into separate amplifiers 38 and 39. These amplifiers correspond to the amplifier 17 shown in Figure 1. The outputs from amplifiers 38 and 39 are separately fed into like channels, each of which correspond to that shown in Figure 1. The output signals from the two channels are transmitted to the surface over separate circuits in the same cable. At the surface the signals in each circuit are separately amplified by the amplifiers 40 and 41. The output signals from these amplifiers are separately fed to pulse rate conversion circuits 42 and 43. The outputs of the pulse rate conversion circuits are connected in opposition across resistors 44 and 45. The difference potential developed is taken off by conductors 46 and 47 and impressed on a recorder in the manner shown in Figure 1.

There has been described above a method and apparatus for making a fast-neutron-slow-neutron well log. Additionally, there is taught the manner of emphasizing specific substances in formations by making a fast-neutron-slow-neutron log, then surrounding the detector with a shield formed of a material corresponding to the substance that it is desired to locate, and making a second log. The second log is then subtracted from the first to obtain a log which emphasizes the substance sought. There is also taught above a method and means for making the last described log in a single surveying operation.

We claim:

1. A method of producing a well log that emphasizes a particular chemical element existing in certain of the formations penetrated by a well that comprises irradiating the formations adjacent to the well with fast neutrons, detecting neutrons which return to the well by producing proportionally related electrical signals, additionally selectively filtering neutrons returning to the well, said filtering action being characteristic of the chemical element that it is desired to emphasize, detecting said filtered neutrons by producing proportionally related electrical signals, subtracting the latter signals from the former signals, and recording the remainder versus the depth at which the detections occurred.

2. A method of producing a well log that emphasizes a particular chemical element existing in certain of the formations penetrated by a well that comprises irradiating the formations adjacent to a well with neutrons, detecting radiation which is produced by neutron interactions in the formations by producing proportionally related electrical signals, suppressing the component thereof corresponding to simultaneously detected gamma radiation, additionally selectively filtering neutrons from the radiation produced by neutron interactions in the formations, said filtering action being characteristic of the chemical substance that it is desired to emphasize, detecting the filtered radiation by producing proportionally related electrical signals, suppressing the component thereof corresponding to simultaneously detected gamma radiation, subtracting the latter unsuppressed filtered signals from the former unsuppressed and unfiltered signals, and recording the remainder versus the depth at which the detections occurred.

3. A method of producing a well log that emphasizes a particular chemical element existing in certain of the formations penetrated by a well that comprises irradiating the formations adjacent to the well with fast neutrons, detecting neutrons which return to the well by producing proportionally related electrical signals, additionally simultaneously selectively filtering neutrons returning to the well, said filtering action being characteristic of the chemical element that it is desired to emphasize, simultaneously and separately detecting said filtered neutrons by producing proportionally related electrical signals, electrically subtracting the latter signals from the former signals, and recording the remainder versus the depth at which the detections occurred.

4. A method of producing a well log that emphasizes a particular chemical element existing in certain of the formations penetrated by a well that comprises irradiating the formations adjacent to a well with neutrons, detecting radiation which is produced by neutron interactions in the formations by producing proportionally related electrical signals, suppressing the component thereof corresponding to simultaneously detected gamma radiation, additionally simultaneously selectively filtering neutrons from the radiation produced by neutron interactions in the formations, said filtering action being characteristic of the chemical substance that it is desired to emphasize, simultaneously and separately detecting the filtered radiation by producing proportionally related electrical signals, suppressing the component thereof corresponding to simultaneously detected gamma radiation, electrically subtracting the latter unsuppressed filtered signals from the former unsuppressed and unfiltered signals, and recording the remainder versus the depth at which the detections occurred.

5. An apparatus for producing a well log that emphasizes a particular chemical element that exists in certain of the formations penetrated by a well that comprises a source of radiation adapted to irradiate the formations with fast neutrons, means for traversing the well with said source, neutron detecting means adapted to detect neutrons which return to the well by producing proportionally related electrical signals, said detecting means being disposed adjacent said source and adapted for movement therewith, means for suppressing detected electrical signals that are produced by the simultaneous detection of gamma radiation, a second neutron detector that is adapted to detect neutrons by producing proportionally related electrical signals, said second detector being disposed adjacent to said first recited detector and adapted for movement therewith, a shield disposed about said second detector, said shield being composed principally of the chemical element that it is desired to emphasize in said log, means for suppressing detected electrical signals that are produced by the simultaneous detection of gamma radiation, means for subtracting the unsuppressed signals produced by the second detector from the unsuppressed signals produced by the first detector, and means for recording the remainder in correlation with the depth at which the detection occurred.

6. An apparatus for producing a well log that emphasizes a particular chemical element that exists in certain of the formations penetrated by a well that comprises a source of radiation adapted to irradiate the formations with fast neutrons, means for traversing the well with said source, neutron detecting means adapted to detect neutrons which return to the well by producing proportionally related electrical pulses, said detecting means being disposed adjacent said source and adapted for movement therewith, means for separating and suppressing detected electrical pulses that are produced by the simultaneous detection of gamma radiation, means for producing a varying direct current that varies with the time-rate of occurrence of the unsuppressed pulses, a second neutron detector that is adapted to detect neutrons by producing proportionally related electrical pulses, said second detector being disposed adjacent to said first recited detector and adapted for movement therewith, a shield disposed about said second detector, said shield being composed principally of the chemical element that it is desired to emphasize in said log, means for separating and suppressing detected electrical pulses that are produced by the simultaneous detection of gamma radiation, means for producing a varying direct current that varies with the time-rate of occurrence of the latter unsuppressed pulses, means for subtracting a function of the last produced direct current from a function of the first produced direct current, and means for recording the remainder in correlation with the depth at which the detection occurred.

JEAN M. THAYER.
ROBERT E. FEARON.

REFERENCES CITED

The following references are of record in the file of this patent:

UNITED STATES PATENTS

| Number | Name | Date |
|---|---|---|
| 2,483,139 | Herzog | Sept. 27, 1949 |

OTHER REFERENCES

Bousquet, Electronic Industries, September 1946, pp. 88-89.